F. W. SEYBOTH.
MECHANICAL STOKER FOR FURNACES.
APPLICATION FILED MAY 14, 1909.

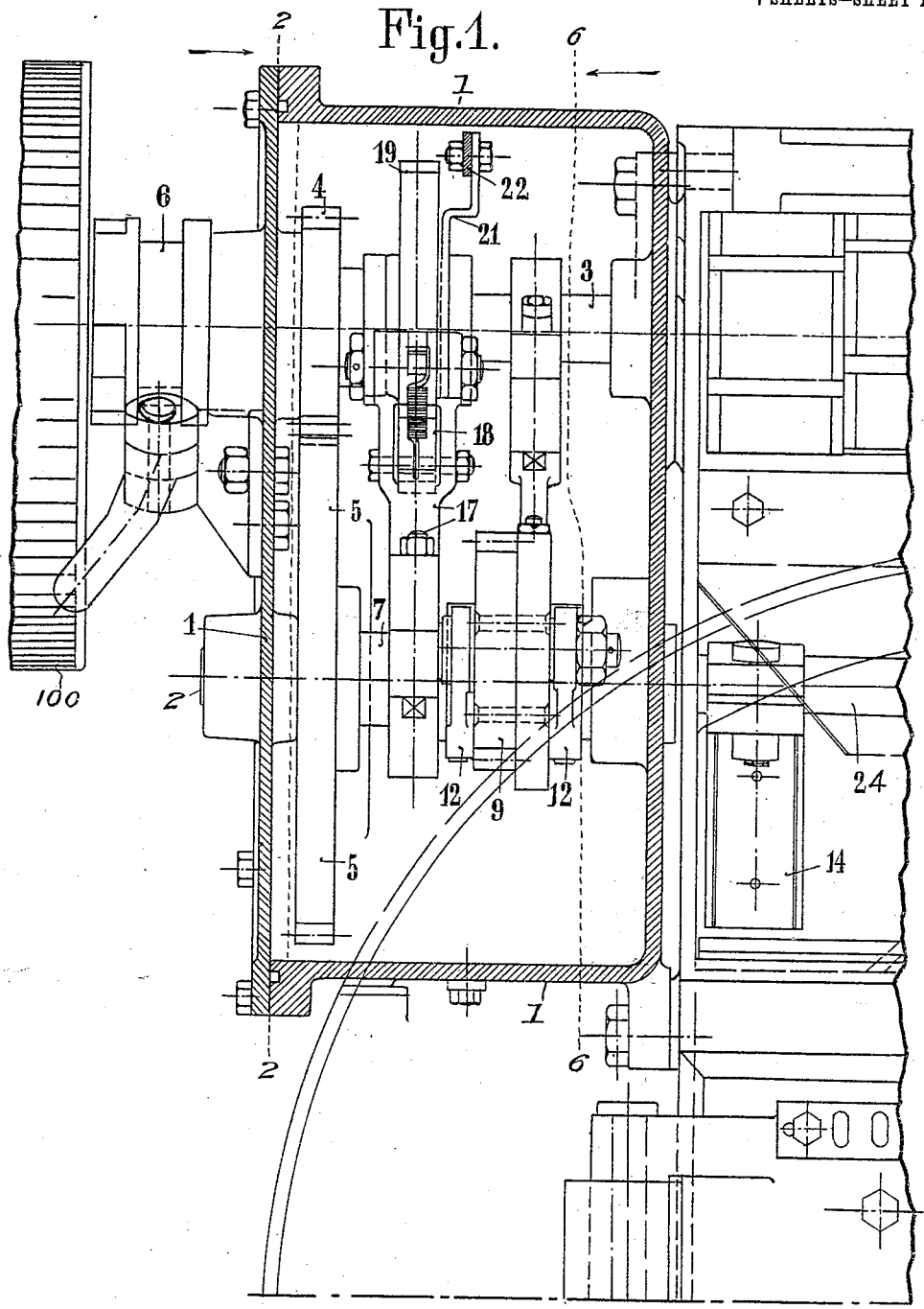

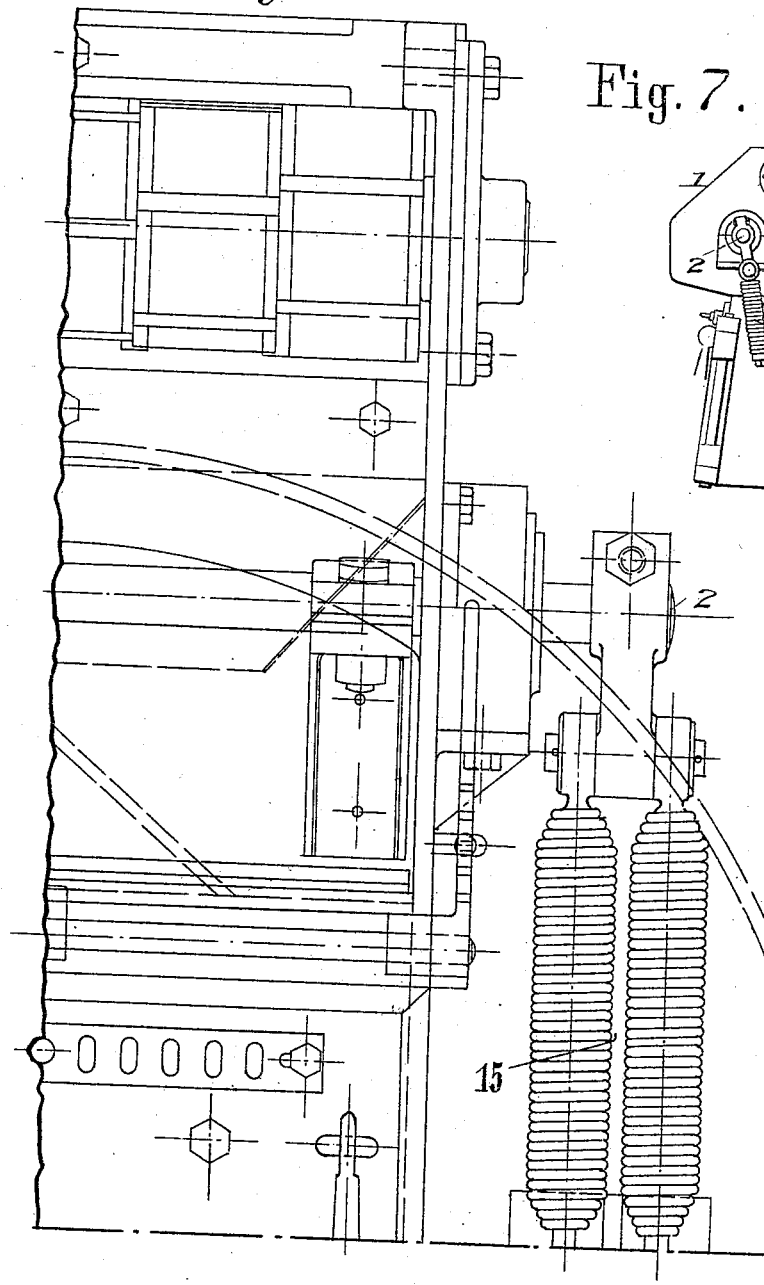
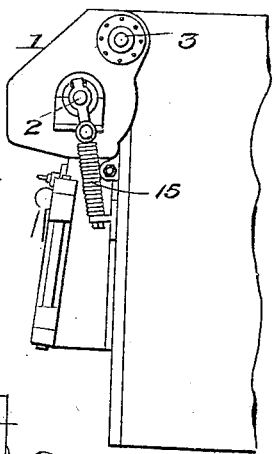

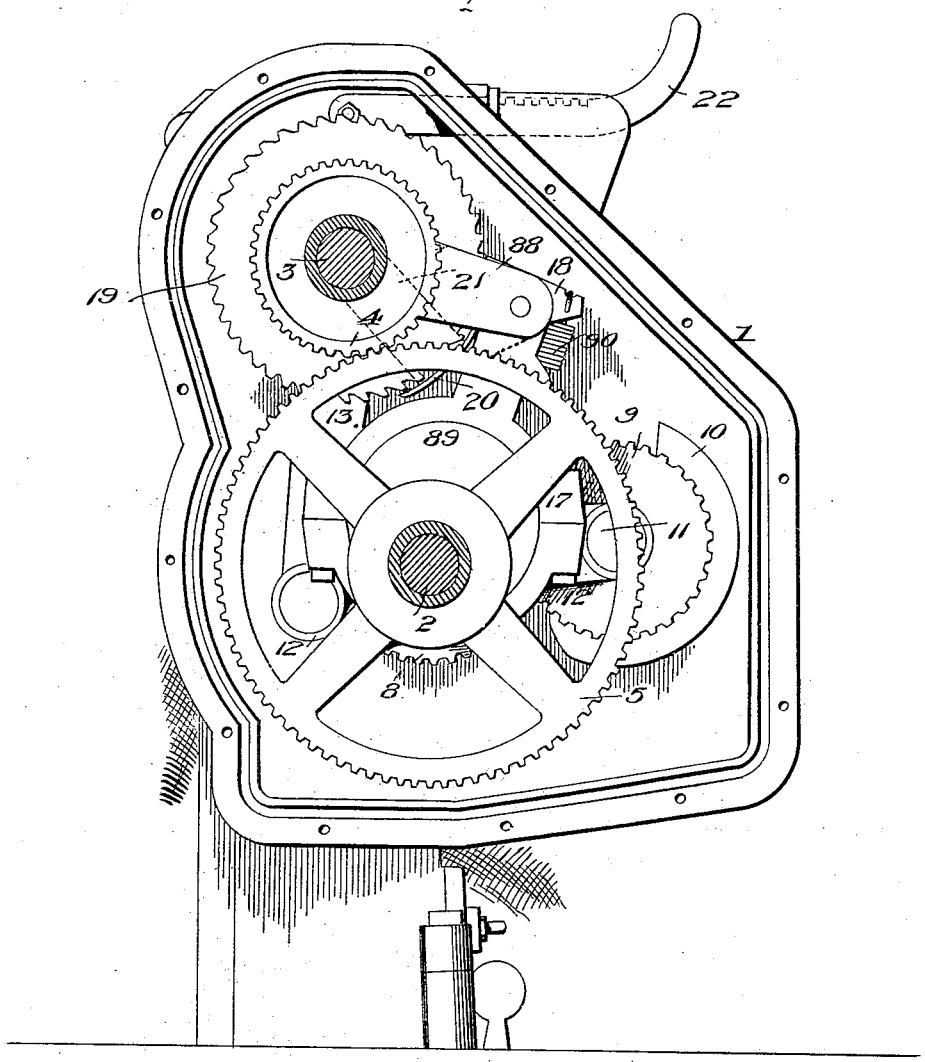

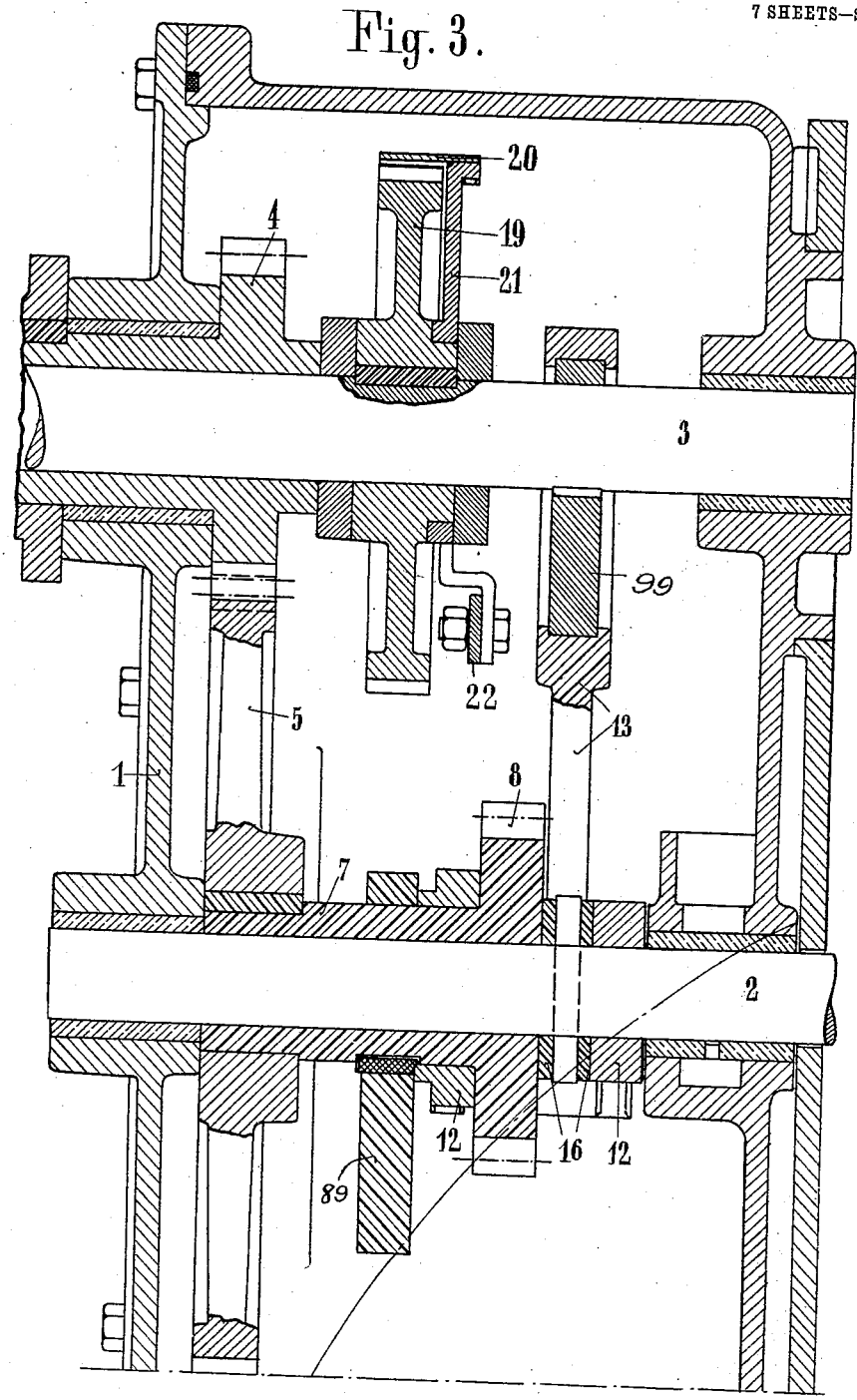

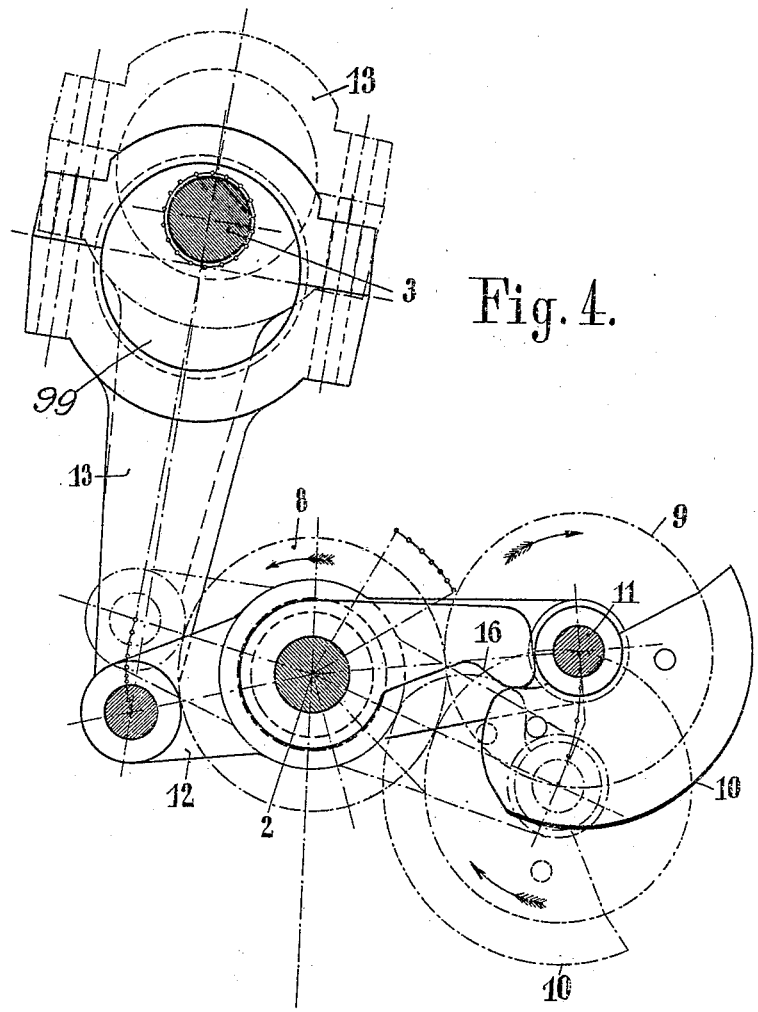

939,869.

Patented Nov. 9, 1909.
7 SHEETS—SHEET 6.

Witnesses:

Inventor:
FRIEDRICH WILHELM SEYBOTH
by
ATTORNEY.

UNITED STATES PATENT OFFICE.

FRIEDRICH WILHELM SEYBOTH, OF ZWICKAU, GERMANY.

MECHANICAL STOKER FOR FURNACES.

939,869.  Specification of Letters Patent.  Patented Nov. 9, 1909.

Application filed May 14, 1909.  Serial No. 496,041.

*To all whom it may concern:*

Be it known that I, FRIEDRICH WILHELM SEYBOTH, a subject of the German Emperor, and resident of Zwickau, in Saxony, Germany, have invented a certain new and useful Improvement in Mechanical Stokers for Furnaces, of which the following is a specification.

In order to obtain a variable throw of the fuel with mechanical stoking devices for furnaces with swinging shovels, it has been proposed to employ irregular cam disks by which a tappet keyed on the shovel shaft was pressed aside against the action of the shovel tension spring. For the sake of rigidity, the number of tappets on the cam disk could not exceed three, so that, with such construction, only three different lengths of throw could be obtained. With such an arrangement, uniform distribution of the fuel on the grate, for all sizes of grates and for all kinds of fuel, cannot be obtained; on the contrary, numerous variations in the length of throw are necessary, especially for small coal and long grates. This desirable result is obtained, in the present invention, by the arrangement of a lever swinging slowly about the actuating shaft of the mechanical stoking device, the means for actuating the shovels being mounted in one arm of said lever.

The invention is illustrated by way of example in the accompanying drawings in which—

Figure 5:
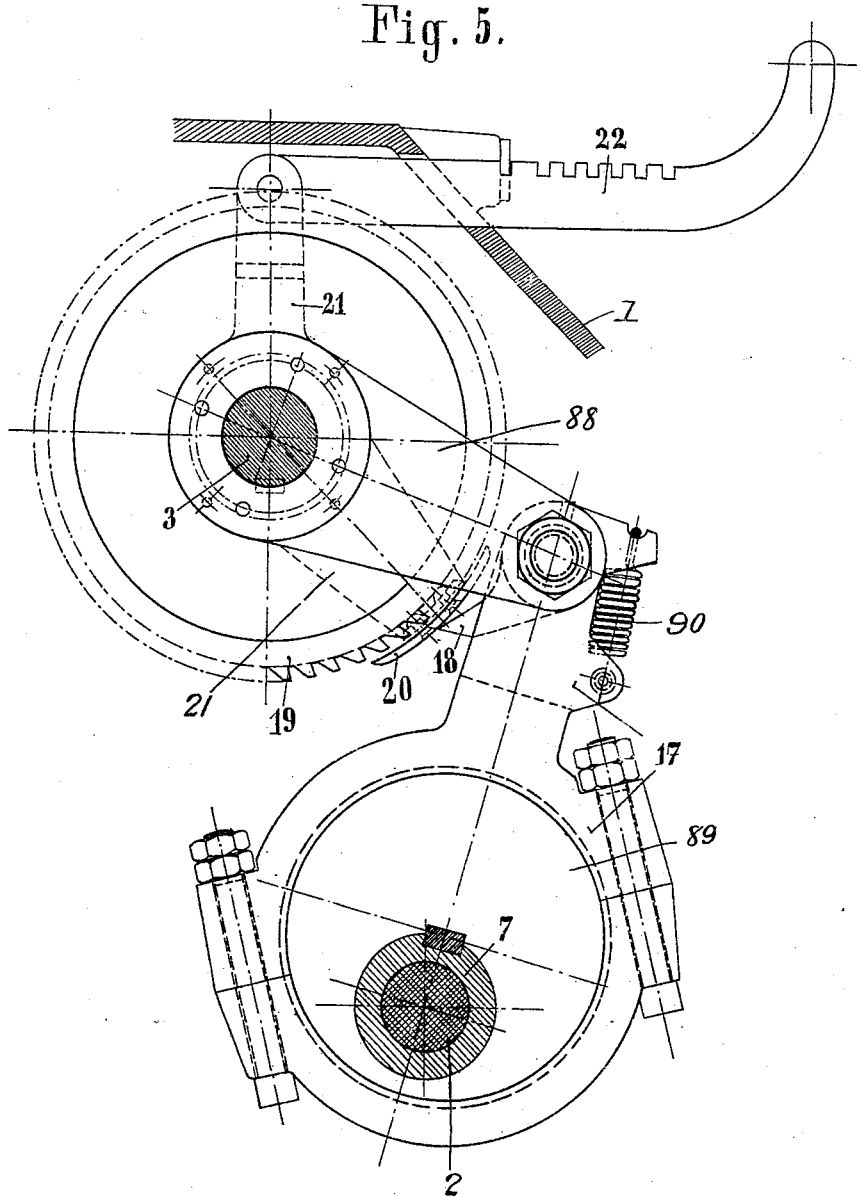
Figure 6:
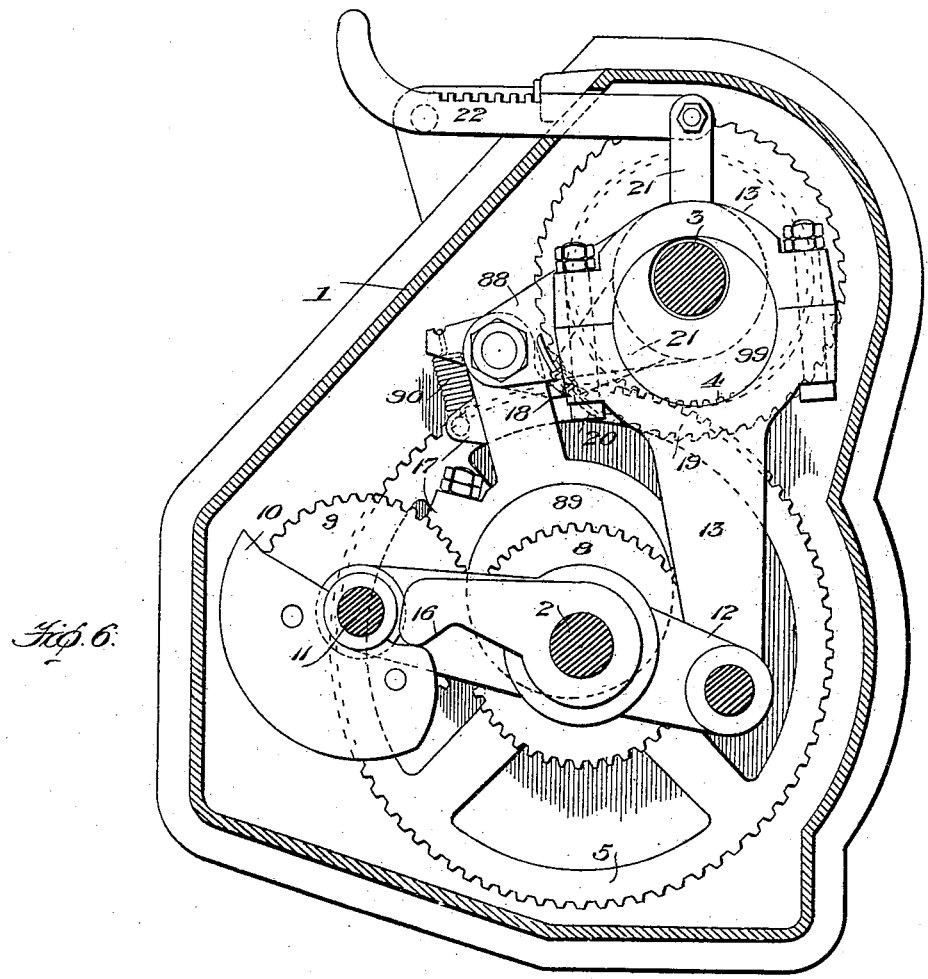

Figures 1 and 1ª illustrate the complete apparatus in part vertical section, the Fig. 1ª being a continuation of Fig. 1; Fig. 2 is a section on line 2—2 of Fig. 1; Fig. 3 is a vertical section through the breaking rolls and shovel actuating mechanism; Fig. 4 shows, diagrammatically, an end view of the shovel actuating mechanism in two different positions. Fig. 5 shows, diagrammatically, the breaking roll actuating mecahnism; Fig. 6 is a section on line 6—6 of Fig. 1, and Fig. 7, a side view showing the stoker applied to a furnace.

In the dust-tight casing, 1, is mounted the driving mechanism both for the shovel actuating shaft, 2, and for the shaft, 3, of the breaking roll. The actuation is effected from the outside by means of a belt pulley, 100 (Fig. 1) which can be connected by a clutch, 6, with the pinion, 4, within the dust-tight casing. This pinion (4) is mounted loosely on the breaking-roll shaft, 3, and is engaged by a gear, 5, (Figs. 1 and 3) which is itself keyed on a sleeve, 7, rotatable on the shovel actuating shaft, 2. By means of external actuating mechanism, after engagement of the clutch 6, the gears, 4, 5 and the bush or sleeve, 7, are rotated.

A pinion, 8, of the shovel actuating shaft is firmly connected with and rotatable by the bush 7 (Fig. 3). Said pinion, 8, engages a pinion 9 (Figs. 2 and 4) to which a cam, 10, is firmly bolted. Both the pinion, 8, and the cam are keyed on a pin, 11, and are pivotally mounted in outer free ends of the double levers, 12, which latter are arranged (see Fig. 3) pivoted at opposite sides of the gear 8. One lever freely rocks on the sleeve 7; the other freely rocks on the shaft 2. Alternatively, the pin 11 may be non-rotatably mounted in the outer free ends of the levers 12, while the pinion 9 and the cam disk 10 are rotatable about the pin 11. A slow oscillatory or swinging motion is imparted to the double levers 12, by means of a link, 13, controlled by an eccentric, 99, which is mounted on the breaking roll shaft, 3. The shovel 14 is keyed directly on the shovel actuating shaft, 2, and is controlled by tension springs, 15 (Fig. 1ª), which normally hold the shovel-actuating shaft in the position corresponding to the least tension on the spring. On the shovel actuating shaft, 2, tappet, 16 (Figs. 2, 3 and 4), is keyed, and, on rotation of the pinions 8 and 9, the tappet is raised by the cam disk 10 in such manner that the springs, 15, are stretched, while, after passage of the eccentric or cam, 10, over the tappet 16, said tappet, and also the shovel-actuating shaft 2 and the shovel 14, are brought quickly back, under the action of the springs 15, to initial positions. Each revolution of the pinion 9 and the cam disk 10, assures a single movement of the shovel.

Referring to the variation of movement of the shovel, it is obvious that if the double levers 12 were held in one position, the tappet 16 would be repeatedly raised to the same extent, and the tension springs 15 would each time be stretched by the same amount, *i. e.* the length of throw of the shovel would be the same. However, by gradual alteration of the position of the levers, 12, and of the pin 11 carried thereby, the cam disk 10 is caused to come in contact with the tappet 16 earlier or later, so that the tappet is raised more or less, the tension springs 15 thus being correspondingly, more or less, extended. The lowest position of the link 13, imparting the rising and falling motion to the double levers 12, is shown in full lines in Fig. 4. In this position the cam disk 10 is in its highest position and in closest proximity to the tappet 16, so that on rotation it immediately engages with the tappet 16 and raises it to the greatest extent, the tension springs 15 being, under such circumstances, subjected to maximum stress.

The highest position of the eccentric 99 (and of link 13) is shown in dotted lines in the same Fig. 4, at which time the cam disk 10 is in the lowest position, and, upon rotation of gear 9, comes in contact with the tappet 16 very late, so that the tappet is raised only a slight distance, the tension springs 15 being stretched only slightly. Corresponding to the intermediate positions of the eccentric 99 between the highest (dotted) position and the lowest (full) position (Fig. 4) the tappet 16 is raised to different extents, and the tension spring 15 is also correspondingly stretched.

The rising and falling movement, or oscillation, of the double levers 12, and of gear 9, is, of course, quite slow, and for this purpose slow, intermittent rotation is given to the shaft 3 and eccentric 99. This is controlled by the gears 4 and 5, sleeve 7, eccentric 89 (Figs. 3 and 5) keyed to said sleeve, link 17, and pawl 18 controlled by spring 90. Said pawl, upon the downward movements of the link 17, engages the ratchet teeth of gear 19, keyed on the shaft 3, thus contributing short movements thereto and to the eccentric 99, link 13 and double levers 12 (Fig. 4). The upper end of the link 17 (Fig. 5) is pivotally connected with a lever arm 88 which is sleeved upon the shaft 3.

In order to vary the extent of motion given to the gear 19 (and thereby contributed to shaft 3, link 13, levers 12 and cam 10), the duration of engagement of that ratchet wheel by the pawl 18 is limited and regulated by a cap, 20, carried upon one arm of a lever 21, the position of which is determined by sliding a bar 22 and locking the notches of the same. When the bar 22 is completely shoved in, the cap 20 is entirely out of the path of the pawl 18, and the maximum movement is given to gear 19; when said bar is fully pulled out, the cap delays the action of said pawl so that only a short movement is given to gear 19. The position of the cap, 20, determines the ratio of movement of sleeve 7 and shaft 3. If, for example, the transmission ratio between the shovel actuating mechanism 8, 9 on the one hand and the breaking roll shaft 3 on the other, is 70:1, on one lift of the eccentric 99 which is keyed on the shaft 3, thirty-five rotations of the cam disk 10, that is, thirty-five separate movements of the shovels 14 take place. Each movement of a shovel occurs at a different position of the double levers 12; by this means, for a single rotation of the breaking roll 3, thirty-five lengths of throw are obtained.

I claim:

1. A mechanical stoker for furnaces, comprising, in combination, a spring actuated shovel-actuating shaft, a shovel operable thereby, a double-armed lever, a rotatable pinion carried by said lever, a cam disk rigidly connected with said pinion and carried by the lever, a tappet keyed to said shovel-actuating shaft and engageable by the cam disk, and a driving pinion meshing with that first-named.

2. A mechanical stoker for furnaces, comprising, in combination, a spring actuated shovel-actuating shaft, a shovel operable thereby, a double-armed lever, a rotatable pinion carried by said lever, a cam disk rigidly connected with said pinion and carried by the lever, a tappet keyed to said shovel-actuating shaft and engageable by the cam disk, a driving pinion meshing with that first-named, and means for slowly rocking said double-armed lever.

3. A mechanical stoker for furnaces, comprising, in combination, a shovel-actuating shaft, a double-armed lever mounted to rock around the said shaft, a pinion rotatably carried by said lever, a cam disk rigidly connected with said pinion, a tappet keyed to said shaft and engageable by the cam disk, a pinion rotatable around said shaft and meshing with the pinion carried by the lever, a breaking-roll shaft, and means carried by the latter shaft for rocking the double-armed lever.

4. A mechanical stoker for furnaces, comprising, in combination, a spring-actuated shovel-actuating shaft, a shovel operable thereby, a sleeve rotatable on said shaft, a double-armed lever mounted to rock on said shaft, a rotatable pinion carried by said lever, a cam disk connected with said pinion and carried by the lever, a tappet keyed to said shovel-actuating shaft and engageable by the cam disk, a pinion carried by the sleeve mentioned and meshing with the pinion carried by the lever, an eccentric carried by the sleeve, a link operated by said eccentric, a second shaft, a gear wheel fixed thereon, a pawl carried by said link for engagement with the last-named gear, an eccentric rigidly mounted on the second shaft, and a link operated by said eccentric and connected with the double-armed lever.

In testimony whereof I have signed my name to this specification in the presence of two subscribing witnesses.

FRIEDRICH WILHELM SEYBOTH.

Witnesses:
WILLIAM J. KOUJETSEN,
VIGGO TVERSEN.